United States Patent [19]

Arlt

[11] Patent Number: 4,627,885
[45] Date of Patent: Dec. 9, 1986

[54] METHOD OF PRODUCING A COMPRESSION LOADED TORSIONAL COUPLING DEVICE

[75] Inventor: Edward J. Arlt, Arlington, Tex.

[73] Assignee: LTV Energy Products Company, Houston, Tex.

[21] Appl. No.: 552,823

[22] Filed: Nov. 17, 1983

[51] Int. Cl.⁴ ............................................ B32B 31/14
[52] U.S. Cl. .................................... 156/160; 156/242; 156/293; 464/73; 464/76; 464/82; 464/83
[58] Field of Search ............... 156/160, 165, 242, 245, 156/293, 306.6, 313; 464/73, 74, 76, 81, 82, 83, 85

[56] References Cited

U.S. PATENT DOCUMENTS

| | | | |
|---|---|---|---|
| 2,343,839 | 3/1944 | Austin | 464/76 |
| 2,588,158 | 3/1952 | Peirce | 464/73 |
| 2,616,273 | 11/1952 | Pringle | 464/73 |
| 3,120,745 | 2/1964 | Sauer | 464/76 |
| 3,636,729 | 1/1972 | Patel | 464/76 |
| 3,902,333 | 9/1975 | Dossier | 464/73 |

OTHER PUBLICATIONS

J. R. Gensheimer, "How to Design Flexible Couplings" (date of publication unknown).
Koppers Engineering Products, Bulleton No. 1500B, "Elastomeric Coupling" (date of publication unknown).

Primary Examiner—Caleb Weston
Attorney, Agent, or Firm—Arnold, White & Durkee

[57] ABSTRACT

There is disclosed a compression loaded torsional coupling device for use in drive shafts to provide a resilient interface between input and output portions of the shaft. Elastomeric cushions between fins extending in alternating fashion from opposed coupling members provide the resiliency. The coupling is produced by a unique process. Elastomer is first inserted into alternating gaps between adjacent fins. This elastomer is then compressed by applying a torque to rotate the coupling members with respect to each other. Elastomer is then placed in the remaining gaps. The torque is then released, permitting the compressive forces to redistribute in the elastomeric material around the circumference of the coupling.

3 Claims, 9 Drawing Figures

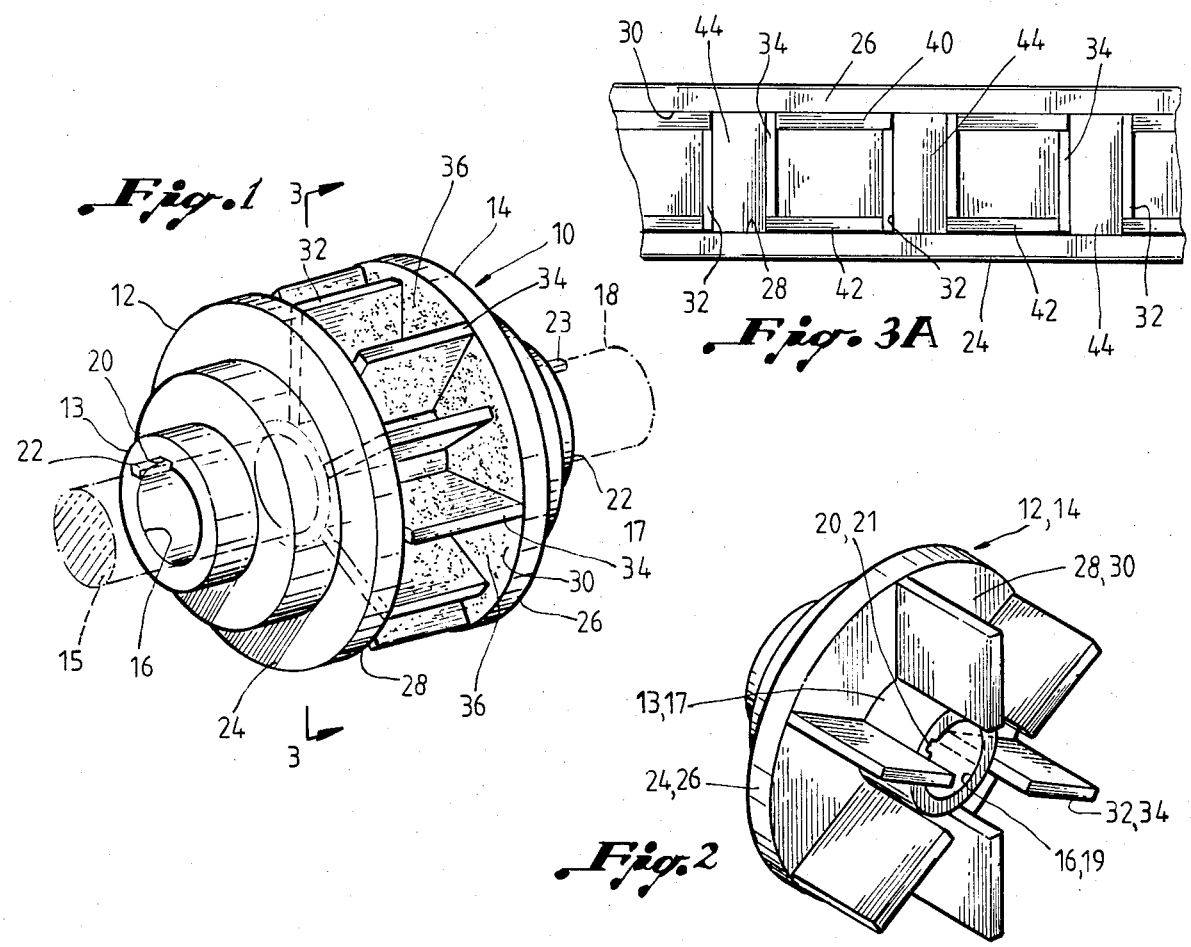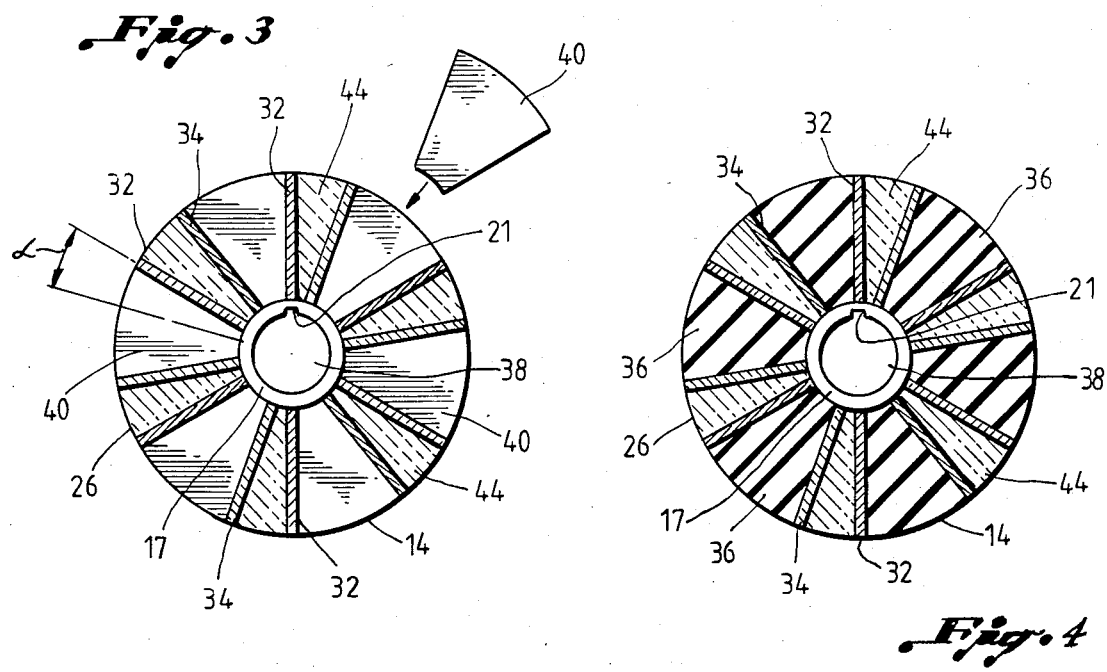

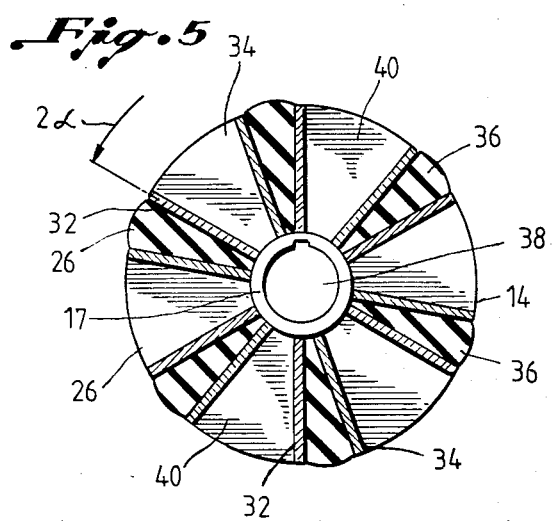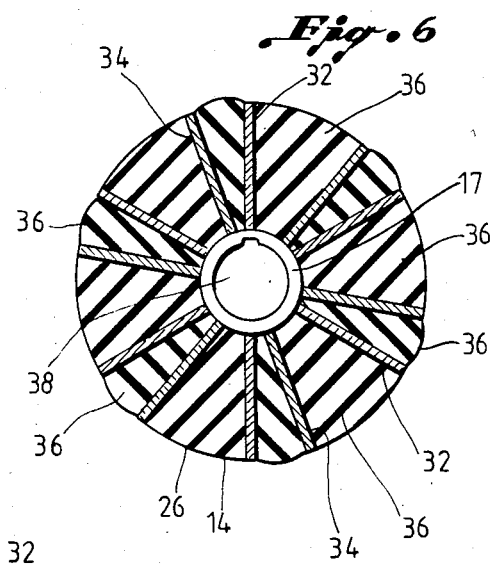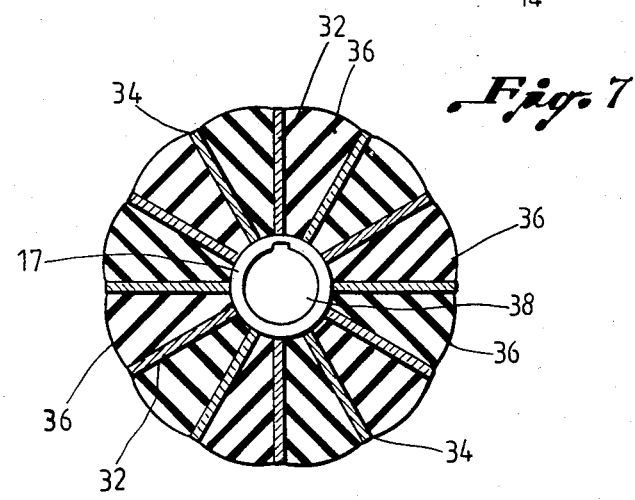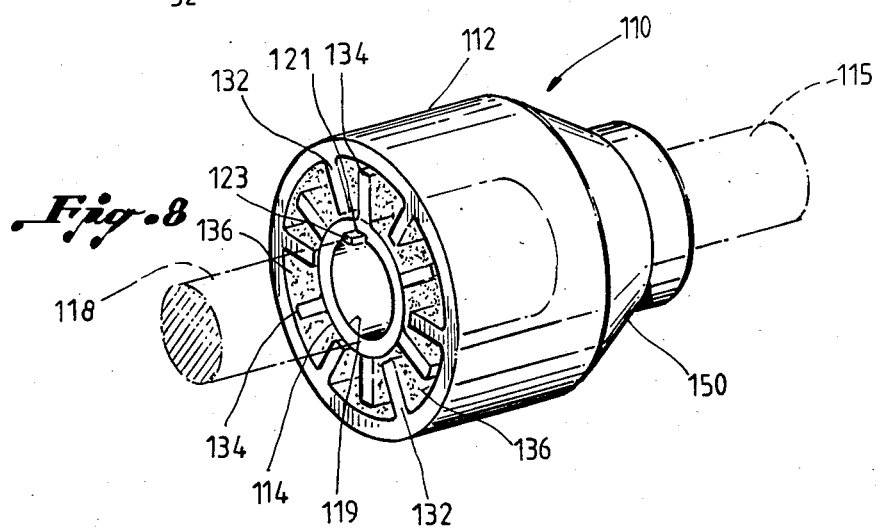

METHOD OF PRODUCING A COMPRESSION LOADED TORSIONAL COUPLING DEVICE

BACKGROUND OF THE INVENTION

This invention relates generally to torsional coupling devices for use in drive shafts, and more particularly to a simplified compression loaded torsional coupling device for such applications which is preloaded in compression.

In service, drive shafts may be subject to unpredictable loadings. If a sudden high loading is applied to the shaft, the shaft could be permanently damaged by the high torsional stresses placed on the shaft. Drive shafts also typically undergo oscillatory loadings, i.e., loadings which are greater or less than the mean load on the shaft. Oscillatory loadings can create undesirable stresses and high noise levels during shaft operation.

To protect a drive shaft from these unpredictable and oscillatory loadings, a torsional coupling device is inserted in the shaft to provide a resilient interface between the powered or input portion of the shaft and the driven or output portion of the shaft. These torsional coupling devices utilize an elastomeric material as an interface to absorb any unpredictable or oscillatory loadings placed on the shaft, to reduce noise levels, and to allow for slight misalignments, axial displacements, or angularities between the input and output shaft portions.

The particular coupling design with which this invention is concerned is referred to as a compression loaded torsional coupling. These couplings have one coupling member mounted on the powered shaft and another coupling member on the driven shaft. Each coupling member has a like number of rigid studs or fins projecting toward the other coupling number, with the fins of each coupling member being positioned between adjacent fins of the other coupling member. Between adjacent fins is an elastomeric cushion which may be bonded to the surface of the fin.

These compression loaded torsional couplings can sustain relatively high torsional loadings for a given coupling size because of an inherent stiffening spring effect. As torque is applied to the shaft, alternate elastomeric cushions are placed in compression. As the load increases, these cushions bulge and deform, making the coupling stiffer as the torque increases.

Also, compression loaded couplings are inherently fail safe because the interpenetrating studs or fins of the coupling members will provide continuity of the coupling, and of the drive shaft, even if the elastomer cushion fails. Therefore, in those applications where the coupling must be fail safe, compression loaded couplings are desirable.

It has been found that the fatigue life of compression loaded torsional couplings can be extended if the bonded elastomeric cushions are not subjected to both tensile and compressive strains during service. By preloading the elastomeric elements in compression a sufficient amount, these cushions will be subject only to compressive strains in service, thus prolonging fatigue life. That is, when oscillatory loads are encountered, the elastomeric cushions do not pass from a compressive to a tensile condition.

Present compression loaded torsional coupling devices, however, have unduly complex designs in order to achieve the preloading necessary to prevent the elastomeric cushion from passing through the the zero strain condition to the tensile condition. An example of such devices is shown in U.S. Pat. No. 3,902,333 to Dossier. This complexity in turn makes these devices more expensive to manufacture. Additionally, present compression loaded devices cannot be preloaded to a sufficient degree to overcome the effects of all oscillatory loads which may be encountered in service.

SUMMARY OF THE INVENTION

By means of the present invention, there is provided a compression loaded torsional coupling device which substantially overcomes the disadvantages of existing compression loaded coupling devices.

In one embodiment of the present invention, there is provided a method of producing a compression loaded torsional coupling device in which a first coupling member, which is axially mountable on the end of a powered shaft, is positioned in spaced relationship from a second coupling member, which is axially mountable on the end of a driven shaft, so that each fin of a plurality of fins, mounted on the first coupling member in spaced radial configuration about the axis of rotation of the coupling, is positioned between adjacent fins of a like number of plurality of fins, mounted on the second coupling member in spaced radial configuration about the axis of rotation of the coupling. Alternate gaps between adjacent fins are substantially filled with an elastomeric material, and the elastomeric material is attached to the fins. A torque is applied to rotate the coupling members with respect to each other to compress the elastomeric material. The remaining gaps are then substantially filled with an elastomeric material, and the elastomeric material is attached to the fins. Finally, the torque is released to allow the compressive forces in the elastomeric material to redistribute in the elastomeric material around the entire circumference of the coupling.

In another aspect of the method of the present invention, the fins of both the first and second coupling members are spaced evenly in radial configuration about the axis of rotation of the coupling. The fins of one coupling member are positioned between adjacent fins of the second coupling member at an angle $\alpha$ from the central position between the adjacent fins of the second coupling member. The wider alternate gaps are first substantially filled with elastomeric material. The coupling members are then rotated with respect to each other an angle $2\alpha$.

In a further aspect of the method of the present invention, the elastomeric material is cured and cooled following placement of the elastomeric material in the gaps. The elastomeric material is bonded to the fins during curing and cooling.

In still another aspect of the method of the present invention, the elastomeric material is molded into the alternate gaps in a first molding step and into the remaining gaps in a second molding step. The molded elastomeric material is cured and cooled following each molding step.

In still a further aspect of the method, inserts are placed in the alternate gaps not being filled during the first molding step to preclude the elastomeric material from those gaps during the first molding step.

In another embodiment of the invention, there is provided a compression loaded torsional coupling device having a first coupling member axially mountable on the end of a powered shaft and having mounted thereon a plurality of fins spaced in radial configuration about the axis of rotation of the coupling. A second coupling member, axially mountable on the end of a driven shaft, is positioned in spaced relationship from the first coupling member. The second coupling member has mounted thereon a plurality of fins equal in number to the plurality of fins of the first coupling member. The fins are spaced in radial configuration about the axis of rotation of the coupling, and each fin of the second coupling member is positioned between adjacent fins of the first coupling member. A precompressed elastomeric cushion is located between each pair of adjacent fins. The elastomeric cushions are precompressed by first substantially filling alternate gaps between adjacent fins with an elastomeric material and attaching the elastomeric material to the fins. A torque is then applied to rotate the coupling members with respect to each other to compress the elastomeric material. The remaining gaps are filled with elastomeric material, and the elastomeric material is attached to the fins. The torque is released to allow the compressive forces in the elastomeric material to redistribute around the entire circumference of the coupling.

In another aspect of the compression loaded torsional coupling device of the present invention, the fins of both the first and second coupling members are spaced evenly in radial configuration about the axis of rotation of the coupling.

In a further aspect of the device of the present invention, the elastomeric cushions are all of the same size.

In still another aspect of the device of the present invention, the elastomeric material is molded into the alternate gaps in a first molding step and into the remaining gaps in a second molding step. The molded elastomeric material is cured and cooled following each molding step, and it is bonded to the fins during this curing and cooling.

In a still further aspect of the device, each coupling member comprises a face plate disc. Each face plate disc has a side facing the other face plate disc. The plurality of fins of each coupling member extend from the side of each face plate disc.

In yet another aspect of the device, the coupling members each comprise a cylindrical ring. One cylindrical ring is substantially smaller than the other. The cylindrical rings are positioned concentrically with respect to each other so that the fins extend radially outwardly from the smaller ring and radially inwardly from the larger ring.

It is therefore an advantage of the present invention that the elastomeric material of the coupling device may be preloaded in compression without complicated mechanical arrangements.

Another advantage of the present invention is that the torsional coupling device can be designed with a very wide range of torsional spring rates from very soft to very stiff.

A further advantage of the invention is that the coupling is fail safe.

Still another advantage is that the torsional coupling device is preloaded in compression for longer dynamic fatigue life.

Yet a further advantage is that the coupling device of the present invention may be fabricated with simple manufacturing techniques, offering economy of materials and labor.

Still a further advantage of the coupling device of the present invention is that it is capable of sustaining relatively high torque loads for a given coupling size.

BRIEF DESCRIPTION OF THE DRAWINGS

FIG. 1 is a perspective view of a compression loaded torsional coupling device in accordance with the present invention.

FIG. 2 is an isolated perspective view of one coupling member of the coupling device of FIG. 1.

FIG. 3 is a sectional view through the coupling device of FIG. 1 showing the coupling members being rotated with respect to each other in preparation for the first molding step.

FIG. 3A is a development top view of the coupling showing the coupling members as positioned in FIG. 3.

FIG. 4 shows the first molding step.

FIG. 5 is a sectional view through the coupling device showing rotation of the coupling members with respect to each other in the opposite direction to compress the elastomeric material.

FIG. 6 shows the second molding step.

FIG. 7 is a sectional view through the coupling device showing the position of the fins following completion of the molding process.

FIG. 8 is a perspective view of an alternative embodiment for the coupling members in accordance with the present invention.

DETAILED DESCRIPTION OF THE PREFERRED EMBODIMENTS

One embodiment of the compression loaded torsional coupling device of the present invention is best understood by reference to FIGS. 1 and 2. Torsional coupling device 10 has a first coupling member 12 and an identical second coupling member 14. First coupling member 12 has a boss 13 mounted therein which in turn is mounted on a powered or input shaft 15 (shown in phantom) by means of a shaft receiving aperture 16 extending through the boss. Likewise, second coupling member 14 has a boss 17 which is mounted to a driven or output shaft 18 (shown in phantom) by means of a shaft receiving aperture 19. A keyway 20, 21 and key 22, 23 rigidly connects each shaft to its respective coupling member 12, 14.

Each coupling member 12, 14 has a face plate disc portion 24, 26, respectively. Each face plate disc 24, 26 has a substantially planar side 28, 30.

As best seen in FIG. 2, a plurality of fins 32, 34, extend perpendicularly from sides 28, 30, respectively. The fins are aligned radially with respect to the shaft axis and are preferably spaced evenly about the circumference of the face plate discs 24, 26. As shown, boss 13 projects from side 28 about one half the width of fins 32. The inner edges of fins 32 are rigidly connected to boss 13, which adds to the stiffness of the fins. Boss 17 likewise extends from side 30 and fins 34 are rigidly connected to the boss.

As shown in FIG. 1, coupling members 12, 14 are positioned in spaced relationship from each other with sides 28, 30 facing each other and substantially parallel. Fins 32 of first coupling member 12 are positioned between adjacent fins 34 of second coupling member 14. Preferably, the space between sides 28, 30 of the coupling members is such that a small gap is maintained between fins 32 and side 30 and between fins 34 and side 28 so that no mechanical contact exists between the coupling members except through the elastomeric interface. Likewise, a small gap exists between bosses 13, 17.

Between each pair of adjacent fins 32, 34 is a preloaded elastomeric cushion 36. These elastomeric cushions are preferably molded into position and bonded to the fins by a process which will now be explained.

Referring to FIG. 3, first and second coupling members 12, 14 are each first placed on a respective shaft 38 for proper alignment and positioned as shown in FIG. 3 with fins 32 of the first coupling member positioned between adjacent fins 34 of the second coupling member. Preferably, fins 32 of first coupling member 12 are displaced by an angle $\alpha$ from a central position between fins 34 of second coupling member 14. The amount of rotation will be determined by the amount of compression preload desired. If a greater preload is desired in elastomeric cushions 36, the angle $\alpha$ is increased.

Various metal inserts are used to preclude elastomer from certain areas of coupling 10 during the molding process. As shown in FIG. 3, shaft 38 precludes elastomer which may seep through the gap between bosses 13, 17 from the central area of the coupling. Flat plate inserts 40, 42 are placed in the gaps between fins 32 and side 30, and the gaps between fins 34 and side 28, respectively, as shown in FIGS. 3 and 3A. Inserts 40, 42 are sized to extend across the wider alternate gaps between adjacent fins 32, 34. Wedges 44 are then placed in the narrower alternate gaps between adjacent fins 32, 34. With these inserts in place, elastomer during the initial molding step will be limited to the wider gaps between adjacent fins 32, 34, and a space will be maintained between the elastomer and the sides 28, 30.

Elastomeric material is then injected under pressure into the wider gaps between adjacent fins 32, 34 to form elastomeric cushions 36 as shown in FIG. 4 by well known molding techniques. The elastomeric material contemplated is preferably a natural rubber or a neoprene or nitrile compound. After injection, cushions 36 are cured and cooled.

Preferably, the elastomeric cushions are bonded directly to fins 32, 34 to preclude penetration of foreign matter from between the fins and the elastomer. This bonding is accomplished as follows. The fins are first carefully cleaned using well-known techniques including sandblasting and application of trichlorylethylene. A suitable primer and a bonding agent are then applied. When the elastomeric material is introduced, the bonding agent permits a bond to form between the elastomer and the fins during curing and cooling.

Next, metal inserts 40, 42, and 44 are removed, and as shown in FIG. 5, a torque is applied to rotate the coupling members 12, 14 in the opposite direction with respect to each other an amount that is preferably twice that of the initial rotation, or $2\alpha$. This rotation compresses the elastomeric material already in place twice as much as the desired preload, and widens the remaining gaps an amount equal to the wider gaps for the initial molding step. Inserts 40, 42 are then replaced in the gaps between fins 32 and side 30 and the gaps between fins 34 and side 28, respectively, extending across the wider alternate gaps between adjacent fins.

As shown in FIG. 6, elastomeric material is then injected into the remaining gaps. After cooling and curing, inserts 40, 42 are removed and the torque is released. This permits the fins to take the final configuration shown in FIG. 7. The fins are now equally spaced around the circumference of coupling device 10. The compression strain which was applied following the first molding step is now distributed equally in all of the elastomeric cushions 36. Further, elastomeric cushions 36 are only in contact with fins 32, 34. The elastomeric material does not touch sides 28, 30 of the face plate discs 24, 26. This configuration provides two advantages. First, no shear forces will be imparted to the elastomeric cushions through sides 28, 30 as a result of any relative rotational displacement between the coupling members. Second, the gaps provide a space into which elastomeric cushions 36 may bulge under compressive loading.

It may be appreciated that a very large range of spring rates (ratio of deflection to applied load) may be achieved by varying one or more of several parameters. For example, the shape factor (the ratio of loaded area to area that is free to bulge) of cushions 36 may be varied by varying the number of fins or the width or height of the fins to achieve the desired spring rate. Further, a relatively hard or relatively soft elastomer may be chosen.

The amount of preload applied during the molding process is determined from the spring rate desired and the fatigue spectrum for the predicted service loadings. It is desirable that the gaps into which the elastomer is injected be of equal size in both the first and second molding steps. This will assure that an equal amount of elastomer is injected between each pair of fins, and that the compressive load will be distributed equally about the circumference of the coupling upon completion of the molding process. It may be appreciated, however, that unequal amounts of elastomer could be placed in the gaps, and the resulting inbalance of load distribution could be compensated for by varying the type of elastomer used from gap to gap. These unequal amounts of elastomer can be achieved by rotating the coupling members an amount not equal to $2\alpha$ or by spacing fins 32, 34 unevenly about the circumference of face plate discs 24, 26. Further, if for the particular application torque will only be applied to the shaft in one direction or if a different torque loading is contemplated for each direction of shaft rotation, one set of alternate elastomeric cushions which take up the torque load in one direction need not be uniform in size or composition to the other set of alternate elastomeric cushions which take up the torque in the opposite direction. This invention is intended to include these variations.

Also, although it is preferable that the elastomer be molded into the gaps, those skilled in the art will appreciate that elastomeric cushions can be molded prior to insertion. Attachment to the fins can then be accomplished by prebonding the cushions to a rigid body, such as a plate, which can then be attached to the fins by some mechanical means, such as by bolting. Alternatively, the elastomeric cushions could be premolded and partially cured. The curing process can then be completed in place so that the cushions are bonded to the fins. Again, this invention is intended to include these variations.

For economical fabrication, the non-elastomeric hardware, including the face plate discs and fins, may be made of a mild steel.

Another embodiment of the invention is shown in FIG. 8. Compression loaded torsional coupling device 110 has an outer first coupling member 112 in the form of a cylindrical ring and an inner second coupling member 114 in the form of a smaller cylindrical ring. The larger cylindrical ring is positioned concentrically about the smaller cylindrical ring. It may be appreciated that the larger ring may be mounted to the powered shaft 115 as shown with the smaller ring mounted on the driven shaft 118, or the large ring may be mounted on the driven shaft with the smaller ring mounted on the powered shaft.

First coupling member 112 has a plurality of fins 132 extending radially inwardly therefrom toward the smaller cylindrical ring and preferably spaced evenly about the circumference of the first coupling member. Correspondingly, second coupling member 114 has a like number of fins 134 extending radially outwardly toward the first coupling member and preferably evenly spaced about the circumference of the second coupling member. Fins 132 are positioned between adjacent fins 134. Between adjacent fins 132, 134 are preloaded elastomeric cushions 136 which are molded into position by the process described previously.

First coupling member 112 is preferably mounted on shaft 115 by a suitable bolt on flange 150. Second coupling member 114 is mounted on shaft 118 by means of a shaft receiving aperture 119 and is held in rigid rotational relationship to the shaft by a keyway 121 and key 123.

The foregoing description has been directed to particular embodiments of the invention in accordance with the requirements of the patent statutes for the purposes of illustration and explanation. It will be apparent, however, to those skilled in this art, that many modifications and changes in the apparatus and method set forth will be possible without departing from the scope and spirit of the invention. It is intended that the following claims be interpreted to embrace all such modifications and changes.

What is claimed is:

1. A method of producing a compression loaded torsional coupling device comprising the steps of:
   a. positioning a first coupling member, axially mountable on the end of a powered shaft, in spaced relationship from a second couplng member, axially mountable on the end of a driven shaft, so that each fin of a plurality of fins, mounted on the first coupling member in spaced radial configuration about the axis of rotation of the coupling, is positioned between adjacent fins of a like number of fins, mounted on the second coupling member in spaced radial configuration about the axis of rotation of the coupling, the fins of the first coupling member being positioned in spaced relationship from the second coupling member, the fins of the second coupling member being positioned in spaced relationship from the first coupling member;
   b. placing inserts in the spaces between one coupling member and the opposed fins of the other coupling member in alternate gaps between adjacent fins;
   c. molding elastomeric material into the alternate gaps between adjacent fins to substantially fill the alternate gaps;
   d. curing and cooling the elastomeric material during which the elastomeric material is bonded to the fins;
   e. removing the inserts;
   f. applying a torque to rotate the coupling member with respect to each other to compress the elastomeric material;
   g. placing inserts in the spaces between one coupling member and the opposed fins of the other coupling member in the remaining alternate gaps;
   h. molding elastomeric material into the remaining alternate gaps to substantially fill the remaining alternate gaps;
   i. curing and cooling the elastomeric material during which the elastomeric material is bonded to the fins;
   j. removing the inserts from the remaining alternate gaps; and
   k. releasing the torque.
2. The method of claim 1, wherein:
   a. the fins of both the first and second coupling members are spaced evenly in radial configuration about the axis of rotation of the coupling;
   b. the fins of one coupling member are positioned between adjacent fins of the second coupling member at an angle $\alpha$ from the central position between the adjacent fins of the second coupling member;
   c. the wider alternate gaps are first substantially filled with elastomeric material; and
   d. the coupling members are rotated with respect to each other through an angle $2\alpha$.
3. The method of claim 2 or 1, wherein inserts are placed in the alternate gaps not being filled during the first molding step to preclude the elastomeric material from those gaps during the first molding step.

* * * * *